Patented Oct. 27, 1953

2,657,244

UNITED STATES PATENT OFFICE 2,657,244

AROMATIC SUBSTITUTED HALO-BUTYNES

Arthur Livingston Barney and Paul Swithin Pinkney, Wilmington, Del., assignors to E. I. du Pont de Nemours & Company, Wilmington, Del., a corporation of Delaware No Drawing. Application July 21, 1948, Serial No. 40,018

7 Claims. (Cl. 260—651)

This invention relates to aromatic compounds having in the side chain an acetylenic linkage.

Aromatically substituted butenynes, particularly those containing a terminal ethynylic (—C≡CH) group, are of interest as synthetic intermediates and in polymeric studies but because of the difficulty and expense involved in their preparation, have remained in large part unexplored.

This invention has as an object the provision of a simple and economic process for the preparation of aromatic compounds having acetylenic linkages. A still further object is the preparation of arylbutenynes from monovinylacetylene, a readily available intermediate from the chloroprene synthesis. Other objects will appear hereinafter.

These objects are accomplished by reacting 1-buten-3-yne, i. e., monovinylacetylene, in the presence of a cupric salt catalyst with an aromatic diazonium halide (chloride or bromide) at a temperature of —10 to 70° C., nitrogen being evolved. The resulting condensation product, a 1-butyne having a monovalent aromatic substituent on the 4-carbon and a halogen (chlorine or bromine) on the 3-carbon, may be dehydrohalogenated, preferably by means of alcoholic alkali metal hydroxide, to form aromatic substituted 1-buten-3-ynes having a terminal acetylenic linkage.

A more restricted and preferred practice of the invention comprises the condensation products and their dehydrohalogenation products which are produced by condensing monovinylacetylene in the presence of a mineral acid salt of divalent copper at a temperature of —10 to 50° C. with a benzene-or chlorinated benzene-diazonium chloride until completion of nitrogen evolution and treating the resulting condensation products with potassium or sodium hydroxide, the molar ratios of aromatic diazonium chloride; monovinylacetylene:copper salt in said condensation reaction being from 1:1:0.1 to 1:5:0.5.

A specific embodiment comprises the reaction product, 4-phenyl-3-chloro-1-butyne, and its dehydrohalogenation product, 4-phenyl-3-buten-1-yne which are produced by reacting benzenediazonium chloride with at least a chemically equivalent quality of monovinylacetylene in the presence of a catalytic amount of cupric chloride at a temperature of 35-40° C. until completion of nitrogen evolution and treating the resulting 4-phenyl-3-chloro-1-butyne with alcoholic potassium hydroxide. The preparation of these and other products of this invention are illustrated in detail in the following examples in which parts are given by weight unless otherwise specified.

Example I

An aqueous solution (650 parts) of benzenediazonium chloride prepared by diazotization of 93 parts of aniline was slowly added dropwise while cold (—5 to 0° C.), over a period of one hour to a stirred suspension of 134 parts of sodium acetate trihydrate, 30 parts of cupric chloride ($CuCl_2.2H_2O$), 200 parts of water, 395 parts of acetone and 52 parts of monovinylacetylene. Evolution of nitrogen started immediately upon introduction of the salt solution with a mild evolution of heat (35–40° C.) which continued throughout the addition period and four hours thereafter. Stirring was continued for about 15 hours at room temperature, after which the pH of the aqueous layer was adjusted to 2 by addition of hydrochloric acid. The aqueous layer was then separated from the oily organic layer and extracted with ether. These ether extracts were combined with the organic layer and the combination was washed with successive portions of water, aqueous 5% sodium bicarbonate solution, and water until substantially neutral. After drying over anhydrous calcium sulfate and removal of the low boiling solvents, ether and acetone, by distillation under reduced pressure (25 mm.), the residue, 142 parts, was fractionally distilled under reduced pressure to give as the chief fraction, a pleasant-smelling, light yellow oil boiling at 59–64° C./0.5 mm., $n_D^{29°\,C.}=1.5515$. Further fractionation of this product, believed to be a mixture of isomers, yielded 3-chloro-4-phenyl-1-butyne B. P. 68–69° C./0.7 mm.; $n_D^{31°\,C.}=1.5460$.

*Analysis.*—Calculated for $C_{10}H_9Cl$: C, 72.95%; H, 5.51%; Cl, 21.54%. Found: C, 72.80%, 72.94%; H, 5.67%, 5.81%; Cl, 20.7%, 20.9%; active Cl, 16.7%, 16.8% (see below).

The product gave a positive test for acetylenic hydrogen and possessed a very reactive chlorine atom as evidenced from the voluminous precipitate of silver chloride resulting from its reaction at room temperature (25° C.) for 15 hours with a 10 per cent ethanol solution of silver nitrate. Utilizing this method, the per cent active chlorine recorded above was determined gravimetrically. Runs by the procedure of this example gave yields of 40 to 45% of theory of the chloro compound.

Example II

Using the same molal proportions as in the above example with the exception of the monovinylacetylene which was used in 43% excess, the aqueous benzenediazonium chloride solution was added to a stirred suspension of the cupric chloride, sodium acetate trihydrate and monovinylacetylene in acetone (2375 parts of acetone to the diazonium salt prepared from 186 parts of aniline). Ninety-five per cent (95%) of the theoretical amount of nitrogen was evolved during the reaction. The filtrate obtained from filtration of the reaction mixture was passed through a stripping still to remove the acetone, and from the residual two phase system, the aqueous layer was separated and extracted with ether, the ether extracts being combined with the oily organic layer and washed and dried as described in the previous example. The organic residue, 286 parts, was then flash-distilled by dropping into a heated distilling flask maintained at 0.7 mm. pressure and heated by a bath at 140° C. By this method approximately 53% of the residue was collected as the light yellow oily isomeric product described in the previous example. The refractive index, $n_D^{25°C.}$ of different batches varied from 1.553 to 1.557.

Further proof, in addition to the properties and analytic data set forth above, of the identity of the main product, 3-chloro-4-phenyl-1-butyne, was afforded by the oxidation and hydrogenation products. On careful oxidation with potassium permanganate, slightly better than 70% of the weight of the original sample was obtained as crude, oily alpha-chloro-beta-phenylpropionic acid possessing a neutral equivalent of 173. This acid was readily dehydrohalogenated to cinnamic acid, the identity of which was established by a mixed melting point with an authentic sample of cinnamic acid.

Hydrogenation of a sample of the above 3-chloro-4-phenyl-1-butyne over Raney nickel catalyst proceeded exothermically to yield 1-phenylbutane, B. P. 27–30° C./1.2 mm.;

$$n_D^{25°C.}=1.4910$$

Bromination of this 1-phenylbutane gave the known [Hennion and Anderson, J. Am. Chem. Soc. 68, 424 (1946)] 1-pentabromophenylbutane, M. P. 75.5–77° C., which on analysis showed a bromine content of 75.0 and 75.1% (theory is 75.6%).

*Example III*

Another satisfactory procedure employs substantially anhydrous crystalline benzenediazonium chloride. This salt was prepared by treating a suspension of 22 parts of aniline hydrochloride in 60 parts of glacial acetic acid with 25 parts of amyl nitrite at 15° C. and precipitating the resulting diazonium compound by the gradual addition of ether. The solid material was filtered and then washed with ether, the ether being subsequently displaced by alternately suspending in acetone and filtering several times. A slurry of this acetone-wet diazonium salt diluted with 39.5 parts of acetone was then added portion-wise to a suspension of 22.8 parts of sodium acetate trihydrate, 5 parts of cupric chloride and 15.8 parts of monovinylacetylene in 79 parts of dry acetone. The reaction proceeded vigorously upon introduction of the diazonium salt and was maintained at 35–40° C. At the conclusion of the reaction, as evidenced by the cessation of nitrogen evolution, the reaction mixture was filtered. Distillation of the filtrate gave 12 parts of 3-chloro-4-phenyl-1-butyne, B. P. 60–84° C./1–1.5 mm., $n_D^{25°C.}=1.5570$.

*Example IV*

An aqueous solution of 209.5 parts of 2,5-dichlorobenzenediazonium chloride and 600 parts of water was slowly added with the temperature at −5 to 0° C. to a suspension of 134 parts of sodium acetate trihydrate, 30 parts of cupric chloride and 52 parts of monovinylacetylene in 200 parts of water and 395 parts of acetone. After the evolution of nitrogen was completed, the layers were separated and the organic layer was washed with water and dried. A small amount of 2,2′,5,5′-tetrachlorodiazoaminobenzene was removed by filtration. The liquid filtrate was distilled to give a fraction of 3-chloro-4(2,5-dichlorophenyl)-1-butyne, a light yellow oil boiling at 115–117° C./1 mm., $n_D^{30°C.}=1.5839$. This material showed the presence of very reactive halogen as well as acetylenic hydrogen.

*Analysis.*—Calculated for $C_{10}H_7Cl_3$: C, 51.4%; H, 3.0%; Cl, 46.3%. Found: C, 51.69%, 51.58%; H, 3.30%, 3.33%; Cl, 43.8%, 44.5%.

*Example V*

The product as described in the previous example was prepared with the same reagents in like molal proportions except that the double salt of zinc chloride and 2,5-dichlorobenzenediazonium chloride was substituted in chemically equivalent amount for the diazonium salt of the previous example. Nitrogen evolution proceeded vigorously with the production of heat (25–35° C.) upon introduction of the double salt into the suspension of the reagents described above. After filtration of the reaction mixture and the usual extraction, washing and distillation procedures, a light yellow oily fraction, B. P. 101–105° C./0.5 mm., substantially identical with the above-described 3-chloro-4(2,5-dichlorophenyl)-1-butyne, was obtained.

*Example VI*

3-chloro-4-phenyl-1-butyne was dehydrohalogenated by the following procedure. To an alcoholic solution of potassium hydroxide (35 parts of potassium hydroxide in 575 parts of ethanol) was added two parts of phenothiazine antioxidant and 82 parts of the 3-chloro-4-phenyl-1-butyne described in the previous examples. Potassium chloride precipitated immediately. The reaction mixture was stirred at room temperature for 1.5 hours and then continued at gentle reflux for an additional period of 2 hours after which 71% of the theoretical amount of potassium chloride was filtered off from the cooled solution. An additional 7 parts (about 19% of the theoretical amount) of potassium chloride was obtained from the solution after it had been allowed to stand at 0° C. under a blanket of nitrogen for 15 hours. After the removal of alcohol by distillation at 90 mm. pressure, the resulting residue was taken up in ether and washed several times with water. These water washes were acidified and extracted with ether, the extracts being neutralized with sodium bicarbonate solution and then combined with the ether solution of the residue. After drying over anhydrous calcium sulfate and removal of the solvent, the residue on distillation under reduced pressure gave the following fractions:

| B. P. | $n_D^{25°C.}$ | Parts |
|---|---|---|
| (1) 48–80° C./1 m. | 1.5960 | 32 |
| (2) 86–115° C./0.8 mm. | 1.5664 | 2.5 |
| (3) Polymeric Residue | | 21 |

The fractions 2 and 3 both gave positive tests for halogen in contrast to fraction 1 which showed practically no halogen. Redistillation of fraction 1 yielded a chief cut boiling at 58.5–61° C./1.7 mm.; and $n_D^{25°C}$ 1.6074; $d.^{25°C}$ 0.9788.

*Analysis.*—Calculated for $C_{10}H_8$: C, 93.8%; H, 6.2%. Found: C, 92.07%, 92.11%; H, 6.19%, 6.42%.

On hydrogenation the product took up 3 mols of hydrogen per mol, thus indicating the presence of one double bond and one triple bond. Furthermore, the product showed the presence of acetylenic hydrogen by liberation of hydrogen on being treated with sodium and evolution of methane on reacting with methyl magnesium iodide. It polymerizes to a solid, i. e., a glass-like resin soluble in benzene and carbon tetrachloride, even on standing at room temperature. The product of fraction 1 is therefor formulated as 4-phenyl-3-butene-1-yne (also named 1-phenyl-1-buten-3-yne).

The invention is, in general, applicable to any aromatic diazonium halide. While the process is applicable to tetrazotized aromatic diamines, e. g., tetrazotized benzidine, it is preferably applied to diazotized monoamines of the formula $ArN_2X$ wherein Ar is a monovalent aromatic radical and particularly to those in which the aromatic radical, Ar, is of the benzene and naphthalene series, i. e., mono and dicyclic isocyclic aromatic radicals and the halogen atom, X, is chlorine or bromine. Examples of aromatic diazonium halides which can be suitably employed include benzenediazonium chloride, 2,5-dichlorobenzenediazonium chloride, p-bromobenzenediazonium, o-chlorobenzenediazonium chloride, p-methoxybenzenediazonium chloride, p-methylbenzenediazonium bromide, 2,5-dimethylbenzenediazonium chloride, 1-naphthalenediazonium chloride, 2-naphthalenediazonium bromide, etc. Because of their low cost and satisfactory reactivity, however, it is preferred to use the aromatic diazonium halides wherein the aromatic radical is an aryl or halogenoaryl radical wherein the halogen is of integral atomic number of 17 to 35, i. e., chlorine or bromine, and preferably those diazonium chlorides and bromides wherein the aromatic radical is phenyl or chlorophenyl. Nitrodiazonium salts are definitely less preferred since the condensation products are of very low heat stability and cause difficulties in isolation. The diazonium halides employed are the chlorides and bromides, i. e., the halides where the halogen is of integral atomic number of 17 to 35 since the fluorides and iodides in addition to their less ready availability and high cost are unsuitable for this reaction. The aromatic diazonium salt may be employed in the form of a stable double salt thereof with, for example, zinc chloride, cuprous chloride, silver chloride, platinum chloride, etc., as illustrated in the examples for reaction with monovinylacetylene to prepare the new compounds, $ArC_4H_4X$, of the invention.

Other catalysts besides cupric chloride which can be employed include copper sulfate, copper acetylacetonate, copper acetate, etc. However, cupric chloride is ordinarily suitable and preferred in most condensations.

The molal proportions of aromatic diazonium halide : monovinylacetylene : catalyst can vary rather widely, for example from 1:1:0.05 to 1:10:1. Because of the most satisfactory reactivity however, it is preferred to maintain such molal ratios from 1:1:0.1 to 1:5:0.5.

While not absolutely essential, the use of buffers such as sodium acetate, disodium phosphate, monopotassium phosphate, potassium acid phthalate, etc., usually gives better results in the reaction of monovinylacetylene with the aromatic diazonium halides. These buffers are ordinarily employed in the same molal proportions as the diazonium halide.

The reaction between the monovinylacetylene and the aromatic diazonium halide can be conducted in water, organic solvents, and in mixtures of water and organic solvents. Although not essential, it is ordinarily preferred to carry out the reaction in the presence of polar organic solvents, since these assist in the intimate contact of the reactants and in general materially improve the results. Examples of organic solvents which may be used include ketones such as acetone and methyl ethyl ketone; alcohols such as ethanol, propanol, butanol, isobutanol, and cyclohexanol; and ethers such as dioxane. Acetone is especially preferred since the best results are usually achieved with this solvent. In dealing with certain sensitive aromatic diazonium halides, it is usually desirable to operate the reaction under anhydrous conditions in the presence of organic solvents.

The above organic solvents can also be used with alkaline reagents such as alkali metal hydroxides, organic bases, etc., for the dehydrohalogenation reaction, particularly those organic solvents in which the reactants are appreciably soluble at the temperature of reaction. Sodium hydroxide and potassium hydroxide are the most economical and for this reason preferred as dehydrohalogenation agents. These alkali metal hydroxides which are employed in at least chemically equivalent amount to the $ArC_4H_4X$ compound being treated ordinarily work best in alcoholic solvents particularly in the range of 60–100° C. although temperatures as high as 150° C. may be employed. This reaction is usually complete in one hour, but may take as much as five or more hours.

The temperature at which the addition reaction between monovinylacetylene and the aromatic diazonium halide is conducted depends, in part, on the particular halide being treated and can vary from −10 to 70° C. but preferably temperatures of −10 to 50° C. are employed. The time of this reaction, governed by cessation of nitrogen evolution, can vary from one to three hours or more. In general, however, it is not desirable to prolong this reaction beyond three hours.

In the process of this invention the condensation takes place with the elimination of nitrogen and the addition of the aromatic radical or fragment to the terminal ethylenic carbon, the halogen atom fragment attaching itself to the other ethylenically bonded carbon.

The new compounds of the invention are useful as intermediates for the preparation of pharmaceuticals, insecticides and polymeric materials.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process wherein an aromatic diazonium halide $RN_2$ Halogen wherein R is a radical from the class consisting of aryl and nuclearly halogenated aryl radicals of the benzene and naphthalene series and each halogen is of the class consisting of chlorine and bromine is reacted at a temperature of −10 to 70° C. in the presence of a cupric salt, with monovinylacetylene.

2. A process wherein a monocyclic aryldiazonium chloride is reacted with monovinylacetylene at a temperature of −10 to 70° C. in the presence of a cupric salt.

3. A process wherein a monocyclic aryldiazonium bromide is reacted with monovinylacetylene at a temperature of −10 to 70° C. in the presence of a cupric salt.

4. Process according to claim 2 wherein the aryl radical is a phenyl radical.

5. A process wherein a chloroaryldiazonium chloride of the benzene and naphthalene series is reacted with monovinylacetylene at a temperature of −10 to 70° C. in the presence of a cupric salt.

6. Process according to claim 5 wherein the chloroaryl radical is a phenyl radical having only chloro substituents.

7. 3-chloro-4-phenyl-1-butyne.

ARTHUR LIVINGSTON BARNEY.
PAUL SWITHIN PINKNEY.

References Cited in the file of this patent

UNITED STATES PATENTS

| Number | Name | Date |
|---|---|---|
| 2,042,223 | Groll et al. | May 26, 1936 |
| 2,097,155 | Groll et al. | Oct. 26, 1937 |
| 2,349,779 | Van Zoeren | May 23, 1944 |

OTHER REFERENCES

Dilthey, J. prakt. Chem., New Series, vol. 142, pages 177–190 (1935).

Meerwein et al., J. prakt. Chem., New Series, vol. 152, pages 237–266 (1939).

Office Pub. Board, Report PB 737 (1943).

Quelet and Golse, "Comptes Rendus," vol. 224, pages 661–3 (1947).